(12) United States Patent
Kokubun et al.

(10) Patent No.: US 11,319,994 B2
(45) Date of Patent: May 3, 2022

(54) THRUST ROLLER BEARING

(71) Applicant: JTEKT CORPORATION, Osaka (JP)

(72) Inventors: Keisuke Kokubun, Utsunomiya (JP);
Yoshihito Nakashima, Kariya (JP);
Taizou Wakayama, Kashiwara (JP);
Shingo Watanabe, Utsunomiya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/951,372

(22) Filed: Nov. 18, 2020

(65) Prior Publication Data
US 2021/0156428 A1 May 27, 2021

(30) Foreign Application Priority Data

Nov. 21, 2019 (JP) .............................. JP2019-210752
Nov. 21, 2019 (JP) .............................. JP2019-210753

(51) Int. Cl.
*F16C 19/30* (2006.01)
*F16C 33/34* (2006.01)
*F16C 33/62* (2006.01)

(52) U.S. Cl.
CPC .............. *F16C 33/62* (2013.01); *F16C 19/30* (2013.01); *F16C 33/34* (2013.01); *F16C 2202/04* (2013.01); *F16C 2204/66* (2013.01); *F16C 2204/70* (2013.01)

(58) Field of Classification Search
CPC ........ F16C 19/30; F16C 19/305; F16C 19/32; F16C 19/34; F16C 33/34; F16C 33/62; F16C 33/583; F16C 33/585; F16C 35/067; F16C 2202/04; F16C 2202/06; F16C 2204/66; F16C 2204/70; F16C 2240/54

USPC .......................... 384/492, 593, 597, 620–622
See application file for complete search history.

(56) References Cited

U.S. PATENT DOCUMENTS

| | | | | |
|---|---|---|---|---|
| RE34,813 E | * | 12/1994 | Gardella ................. | F16C 19/30 384/539 |
| 5,927,868 A | * | 7/1999 | Critchley ............ | F16C 33/6651 384/606 |
| 6,945,700 B2 | * | 9/2005 | Fugel ...................... | F16C 19/30 384/620 |
| 7,104,699 B2 | * | 9/2006 | Shattuck ................. | F16C 19/30 384/455 |

(Continued)

FOREIGN PATENT DOCUMENTS

| | | | | |
|---|---|---|---|---|
| EP | 1344953 | A2 * | 9/2003 | ............ F16C 33/585 |
| EP | 1726838 | A2 * | 11/2006 | .............. F16C 33/64 |

(Continued)

*Primary Examiner* — Phillip A Johnson
(74) *Attorney, Agent, or Firm* — Oliff PLC (57) ABSTRACT

A thrust roller bearing includes a plurality of radially arranged rollers, and a pair of annular washers having raceway surfaces on which the rollers roll, the raceway surfaces being arranged to face each other. The roller is made of high-carbon chromium bearing steel, and contains 1.1 mass % to 1.6 mass % of carbon and 0.1 mass % to 0.6 mass % of nitrogen in a range of 0.1 mm from a surface. A surface compressive residual stress is smaller than −900 MPa, a surface roughness is 0.01 to 0.10 in terms of Rvk and 0.01 to 0.08 in terms of Rk, and a Vickers hardness of the surface is 860 to 980. At least one of the washers is made of carbon steel, and surface roughnesses of the raceway surfaces are 0.05 to 0.20 in terms of Rvk and 0.08 to 0.15 in terms of Rk.

2 Claims, 6 Drawing Sheets

(56) References Cited

U.S. PATENT DOCUMENTS 7,775,724 B2 * 8/2010 Brown .................. F16C 33/588
384/597

FOREIGN PATENT DOCUMENTS

| EP | 2743032 A1 | * | 6/2014 | ............. F16C 33/64 |
| JP | 2003-239981 A | | 8/2003 | |
| JP | 2004144279 A | * | 5/2004 | ............. F16C 33/64 |
| JP | 2009185943 A | * | 8/2009 | ............. F16C 33/62 |
| JP | 2010025249 A | * | 2/2010 | ............. F16C 19/30 |
| KR | 20030077967 A | * | 10/2003 | ................ F02F 1/20 |
| WO | WO-2009116269 A1 | * | 9/2009 | ............. F16C 33/34 |

* cited by examiner

LUBRICATING OIL

THRUST ROLLER BEARING

CROSS-REFERENCE TO RELATED APPLICATION

This application claims priority to Japanese Patent Application No. 2019-210752 filed on Nov. 21, 2019 and Japanese Patent Application No. 2019-210753 filed on Nov. 21, 2019, each incorporated herein by reference in its entirety.

BACKGROUND

1. Technical Field

The present disclosure relates to a thrust roller bearing.

2. Description of Related Art

A thrust roller bearing including a plurality of radially arranged rollers and a pair of annular washers having raceway surfaces on which the rollers roll is known (for example, refer to Japanese Unexamined Patent Application Publication No. 2003-239981 (JP 2003-239981 A)). The thrust roller bearing is, for example, inserted between a non-rotating member and a rotating member in a transmission of a vehicle, and is used to smooth a rotation of the rotating member while receiving a thrust force in a bearing axis direction.

SUMMARY

In the thrust roller bearing, when foreign matter is contained in lubricating oil, wear may increase due to influence of the foreign matter. In recent years, an amount of lubricating oil supplied to a transmission of a vehicle or the like has tended to decrease, and an amount of foreign matter contained in the lubricating oil has tended to increase due to influence of wear debris generated in other members such as a housing. Therefore, a thrust roller bearing having high a foreign matter resistance that can suppress wear even when the amount of the foreign matter contained in the lubricating oil is large is desired.

The present disclosure provides a thrust roller bearing having an improved foreign matter resistance.

An aspect of the present disclosure relates to a thrust roller bearing. The thrust roller bearing includes a plurality of radially arranged rollers, and a pair of annular washers having raceway surfaces on which the rollers roll. The raceway surfaces are arranged to face each other. The roller is made of high-carbon chromium bearing steel, and contains 1.1 mass % to 1.6 mass % of carbon and 0.1 mass % to 0.6 mass % of nitrogen in a range of 0.1 mm from a surface. A surface compressive residual stress is smaller than −900 MPa, a surface roughness is 0.01 to 0.10 in terms of Rvk and 0.01 to 0.08 in terms of Rk, and a Vickers hardness of the surface is 860 to 980. At least one of the washers is made of carbon steel, and surface roughnesses of the raceway surfaces are 0.05 to 0.20 in terms of Rvk and 0.08 to 0.15 in terms of Rk.

According to the aspect, a foreign matter resistance can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the present disclosure will be described with reference to FIGS. 1 to 6. Note that, the embodiment described below is shown as a preferred specific example for implementing the present disclosure. Although some technically preferable technical matters are specifically illustrated, the technical scope of the present disclosure is not limited to the specific embodiment.

Figure 1:
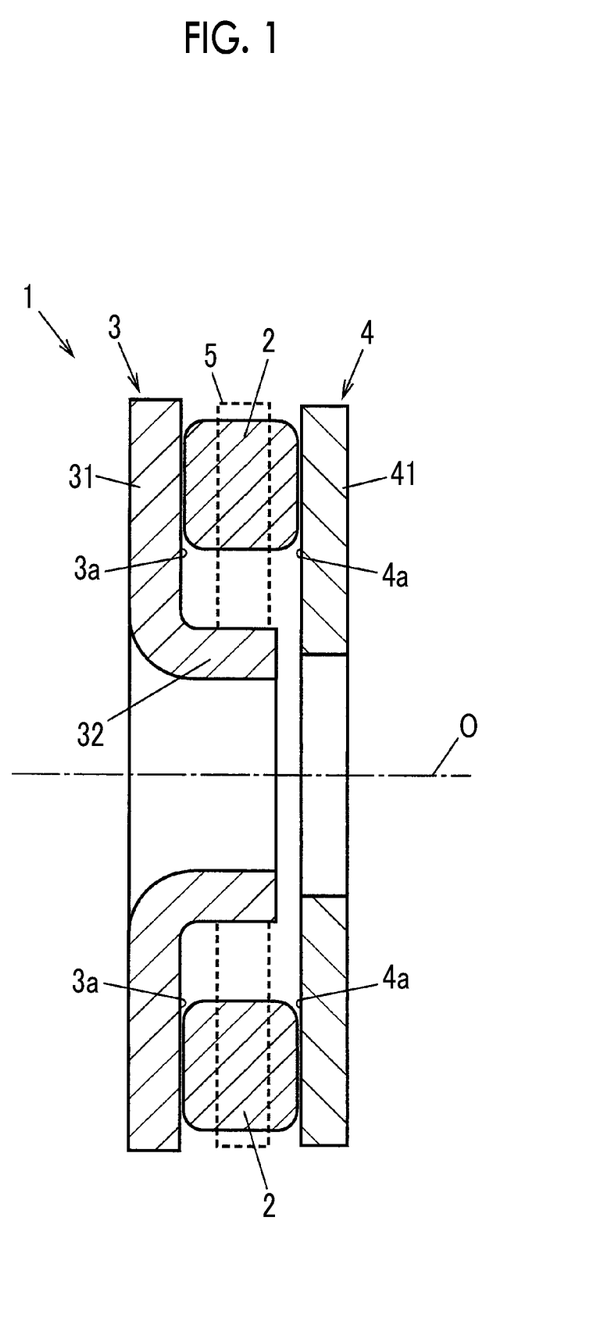
FIG. 1 is a cross-sectional view showing a cross section including a bearing axis of a thrust roller bearing according to an embodiment of the present disclosure.

FIG. 1 is a cross-sectional view showing a cross section including a bearing axis of a thrust roller bearing according to the present embodiment. A thrust roller bearing 1 includes a plurality of radially arranged rollers 2, an annular first washer 3 having a first raceway surface 3a on which the rollers 2 roll, and an annular second washer 4 having a second raceway surface 4a on which the rollers 2 roll. The first and second washers 3, 4 are arranged such that the first and second raceway surfaces 3a, 4a face each other in an axial direction of a bearing axis-O. In the thrust roller bearing, the first washer 3 and the second washer 4 relatively rotate around the bearing axis-O.

The thrust roller bearing 1 is a bearing that is, for example, inserted between a rotating member and a non-rotating member in a transmission of a vehicle or an industrial machine, and that is used to smooth a rotation of the rotating member while receiving a thrust force in the axial direction by rolling the rollers 2.

The rollers 2 are rollably held by annular cages 5 shown by broken lines in FIG. 1. The rollers 2 revolve around the bearing axis-O by being held by the cages 5 while rotating with the relative rotation between the first washer 3 and the second washer 4. The first washer 3 integrally has a circular flat plate-shaped raceway portion 31 perpendicular to the axial direction, and a short cylindrical rib 32 extending from a radially inner end of the raceway portion 31 to a first side in the axial direction (the right side in FIG. 1, the second washer 4 side). A surface of the raceway portion 31 on the first side in the axial direction is the first raceway surface 3a. The second washer 4 has a circular flat plate-shaped raceway portion 41 perpendicular to the axial direction. A surface of the raceway portion 41 on a second side in the axial direction (the left side in FIG. 1, the first washer 3 side) is the second raceway surface 4a. In the present embodiment, the first washer 3 is provided on the rotating member, and the second washer 4 is provided on the non-rotating member.

The shapes of the first and second washers 3, 4 are not limited to those illustrated. For example, the rib 32 of the first washer 3 may be omitted, or the second washer 4 may have a short cylindrical rib extending from a radially outer end of the raceway portion 41 to the second side in the axial direction.

As the roller 2, a roller made of high-carbon chromium bearing steel having a high wear resistance may be used. In the present embodiment, the roller 2 in which a special heat treatment is performed on high-carbon chromium bearing steel to further improve a surface hardness is used. More specifically, the roller 2 contains 1.1 mass % to 1.6 mass % of carbon and 0.1 mass % to 0.6 mass % of nitrogen in a range of 0.1 mm from the surface. As the first and second washers 3, 4, washers made of carbon steel having a relatively high hardness and a high wear resistance are used.

Figure 2A:
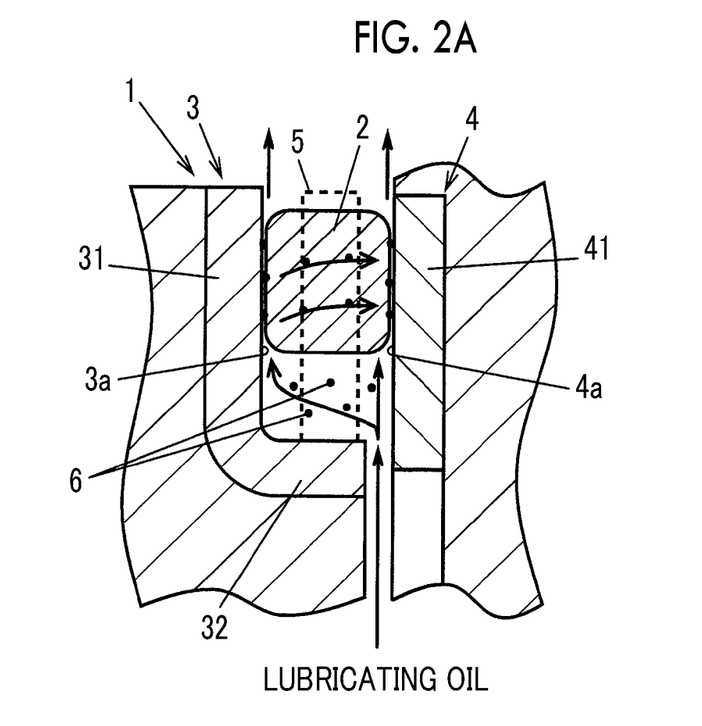
FIG. 2A is a diagram illustrating wear due to foreign matter contained in lubricating oil.
Figure 2B:
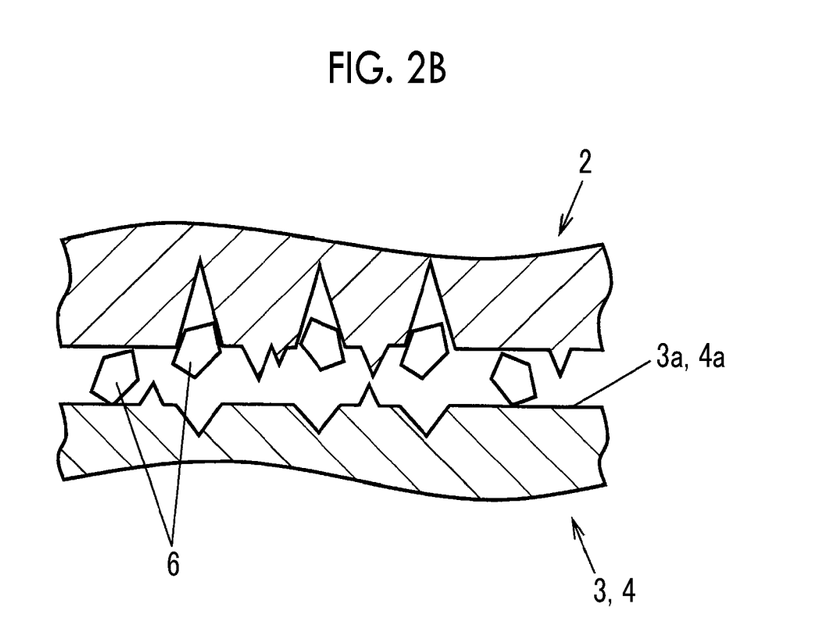
FIG. 2B is a diagram illustrating wear due to the foreign matter contained in the lubricating oil.

As shown in FIG. 2A, in the thrust roller bearing 1, lubricating oil is supplied from the bearing axis-O side. When the lubricating oil contains a large amount of foreign matter 6 such as wear debris, as shown in FIG. 2B, the foreign matter 6 is bitten into fine irregularities on surface of the roller 2 or the raceway surfaces 3a, 4a. The discharge of the foreign matter 6 by the flow of the lubricating oil is difficult, and wear is likely to occur on the surface of the roller 2 or the raceway surfaces 3a, 4a due to influence of the bitten foreign matter. Therefore, in the present embodiment, the discharge of the foreign matter 6 by the flow of the lubricating oil is promoted by smoothing the surface of the roller 2 and the raceway surfaces 3a, 4a such that the wear due to the influence of the foreign matter 6 is suppressed.

Specifically, in the present embodiment, a surface roughness of the roller 2 is set to 0.01 to 0.10 in terms of Rvk and 0.01 to 0.08 in terms of Rk. Further, in the present embodiment, surface roughnesses of the raceway surfaces 3a, 4a of the first and second washers 3, 4 are set to 0.05 to 0.20 in terms of Rvk and 0.08 to 0.15 in terms of Rk. As in the present embodiment, it is desirable that the surface roughnesses of both of the raceway surfaces 3a, 4a of the first and second washers 3, 4 are set to be within the numerical range. However, the effect of reducing the wear due to the influence of the foreign matter 6 as compared with the conventional case can be obtained by setting the surface roughness of at least one of the raceway surfaces 3a, 4a of the first and second washers 3, 4 to be within the numerical range. The surface roughness of the roller 2 or the surface roughnesses of the raceway surfaces 3a, 4a can be appropriately adjusted with a polishing condition in a polishing process such as barrel polishing.

Figure 3:
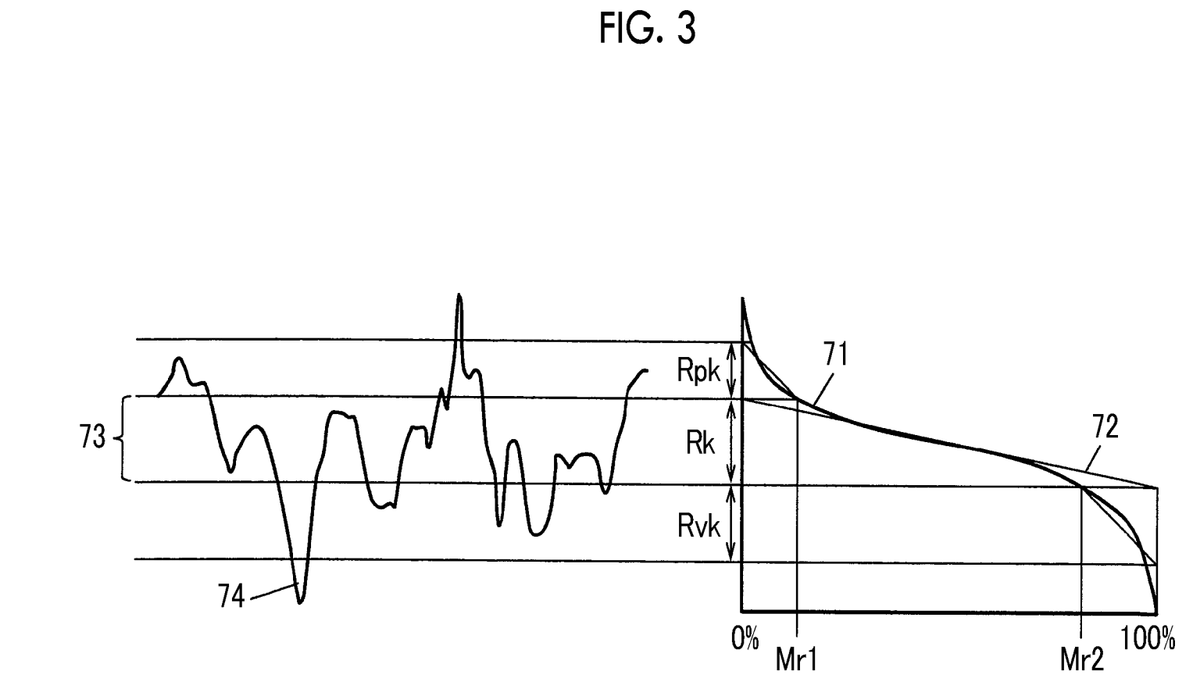
FIG. 3 is a graph illustrating Rvk and Rk that are parameters representing a surface roughness.

Here, Rvk and Rk representing the surface roughness are lubricity evaluation parameters (load curve parameters) of a plateau structure surface. As shown in FIG. 3, an area between height positions where an equivalent straight line 72 that is the gentlest slope of the central portion of a load curve 71 of surface irregularity intersects load length ratios of 0% and 100% is defined as a core portion 73. The height of the core portion 73 (level difference between top and bottom) is Rk. Rvk represents the depth of a projecting valley portion 74.

Further, in the present embodiment, a wear resistance is further improved by performing shot peening on the roller 2 to increase a hardness of the surface of the roller 2. Specifically, a Vickers hardness of the surface of the roller 2 is 860 to 980. Further, a surface compressive residual stress of the roller 2 is set to be smaller than −900 MPa (absolute value is larger than 900 MPa). The hardness and the compressive residual stress of the surface of the roller 2 can be appropriately adjusted with a shot peening condition or a processing condition in a heat treatment process. Further, when the roller 2 is manufactured, it is preferable that the shot peening is performed after the heat treatment process and then the polishing process is performed. Vickers hardnesses of surfaces of the first and second washers 3, 4 are set to 780 to 850.

Evaluation of Foreign Matter Resistance

The thrust roller bearing 1 according to the present embodiment was manufactured as a prototype and used in Example and the foreign matter resistance was evaluated. The thrust roller bearing 1 according to Example was manufactured as follows. A bar line of JIS SUJ2 was cut to obtain a workpiece of the roller of Example. The workpiece of the roller was carbonitrided by being held for one hour at a temperature of 820° C. to 870° C. in an atmosphere with a carbon potential of 1.2 to 1.6 and an ammonia concentration of 0.1 vol % to 0.5 vol %. Then, the workpiece of the roller was immersed, rapid-cooled, and quenched in oil at 80° C. After quenching, the workpiece of the roller was tempered for one hour at 200° C. Then, the shot peening was performed, the polishing was performed, and the barrel polishing was performed for two hours. As a result, the roller 2 of Example was obtained. In a range of 0.1 mm from the surface of the roller 2 of Example, 1.1 mass % to 1.6 mass % of carbon and 0.1 mass % to 0.6 mass % of nitrogen were contained. The shot peening conditions were as follows.

Shot particle diameter: 100 μm or smaller
Shot particle material: Iron
Shot pressure: 0.5 MPa SAE1075 steel plate was annularly punched out and forged to produce a workpiece of the first washer of Example and a workpiece of the second washer of Example. The workpiece of the first washer of Example and the workpiece of the second washer of Example were held for 0.5 hours at a temperature of 760° C. to 830° C. and were immersed, rapid-cooled, and quenched in oil at 80° C. After quenching, the workpieces were tempered for one hour at 200° C. Then, the polishing was performed, and the barrel polishing was performed for five hours. As a result, the first washer 3 of Example and the second washer 4 of Example were obtained. SPCD steel plate was punched out annularly to remove a portion that was to be a pocket. Thereby, the cage 5 was obtained. The thrust roller bearing 1 was manufactured by combining the roller 2 of Example, the first washer 3 of Example, the second washer 4 of Example, and the cage 5. As a result, the thrust roller bearing 1 of Example was obtained.

The evaluation of the foreign matter resistance was performed as follows. A test was performed for 20 hours at an axial load of 9 kN and a rotation speed of 2000 rpm by supplying, from the bearing axis-O side, the lubricating oil containing 0.06 mass % of the foreign matter 6 composed of $SiO_2$ having a particle diameter of approximately 50 μm. Then, wear mass was measured by subtracting mass after the test from initial mass. The number of tests was three times.

Further, for comparison with Example, a thrust roller bearing of Conventional Example in which the roller 2 made of a quenched and tempered material of high-carbon chromium bearing steel was used and the surface roughness of the roller 2 or the surface roughnesses of the raceway surfaces 3a, 4a was not particularly adjusted was prepared. The evaluation of the foreign matter resistance was performed in the same manner as in Example.

The thrust roller bearing 1 according to Conventional Example was manufactured as follows. A bar line of JIS SUJ2 was cut to obtain a workpiece of the roller of Conventional Example. The workpiece of the roller of Conventional Example was held for 0.5 hours at a temperature of 820° C. to 850° C. and was immersed, rapid-cooled, and quenched in oil at 80° C. After quenching, the workpiece of the roller was tempered for one hour at 200° C. Then, the polishing was performed, and the barrel polishing was performed for one hour. As a result, the roller 2 of Conventional Example was obtained. SAE1075 steel plate was annularly punched out and forged to produce a workpiece of the first washer of Conventional Example and a workpiece of the second washer of Conventional Example. The workpiece of the first washer of Conventional Example and the workpiece of the second washer of Conventional Example were held for 0.5 hours at a temperature of 760° C. to 830° C. and were immersed, rapid-cooled, and quenched in oil at 80° C. After quenching, the workpieces were tempered for one hour at 200° C. Then, the polishing was performed, and the barrel polishing was performed for one hour. As a result, the first washer 3 of Conventional Example and the second washer 4 of Conventional Example were obtained. SPCD steel plate was punched out annularly to remove a portion that was to be a pocket. Thereby, the cage 5 was obtained. The thrust roller bearing 1 was manufactured by combining the roller 2 of Conventional Example, the first washer 3 of Conventional Example, the second washer 4 of Conventional Example, and the cage 5. As a result, the thrust roller bearing 1 of Conventional Example was obtained.

Figure 4A:
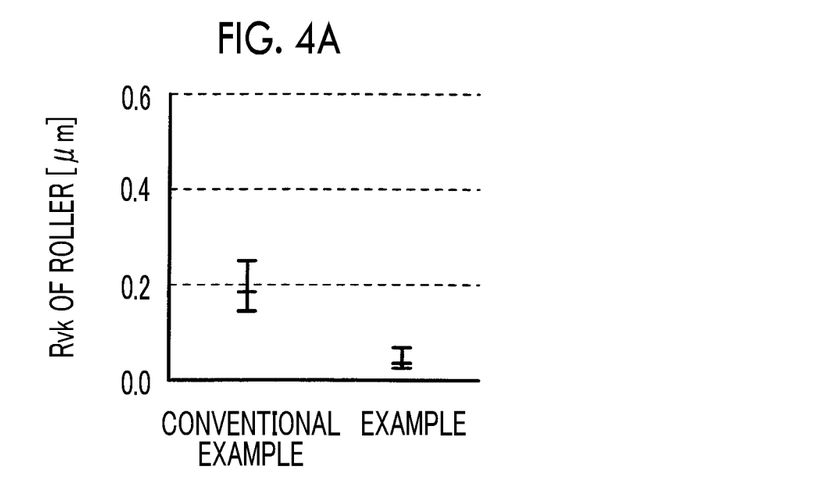
FIG. 4A is a graph showing Rvk of a roller in Example of the present disclosure and Conventional Example.
Figure 4B:
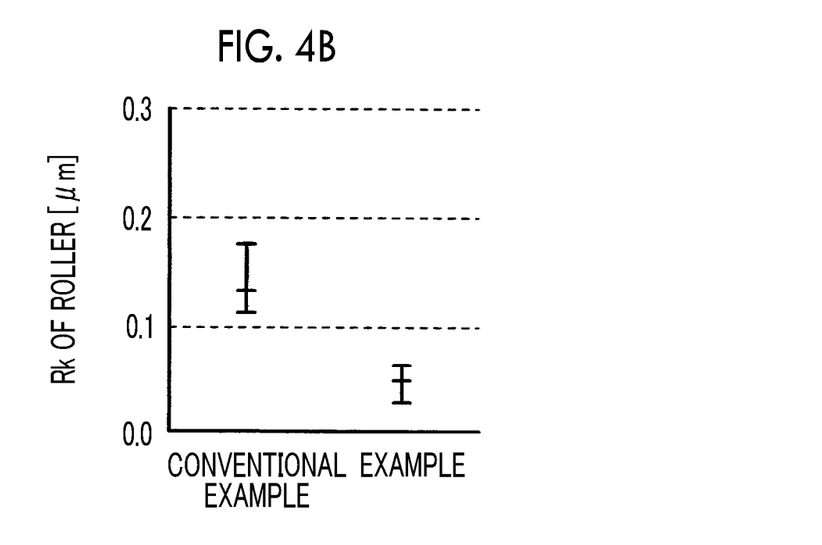
FIG. 4B is a graph showing Rk of the roller in Example of the present disclosure and Conventional Example.
Figure 4C:
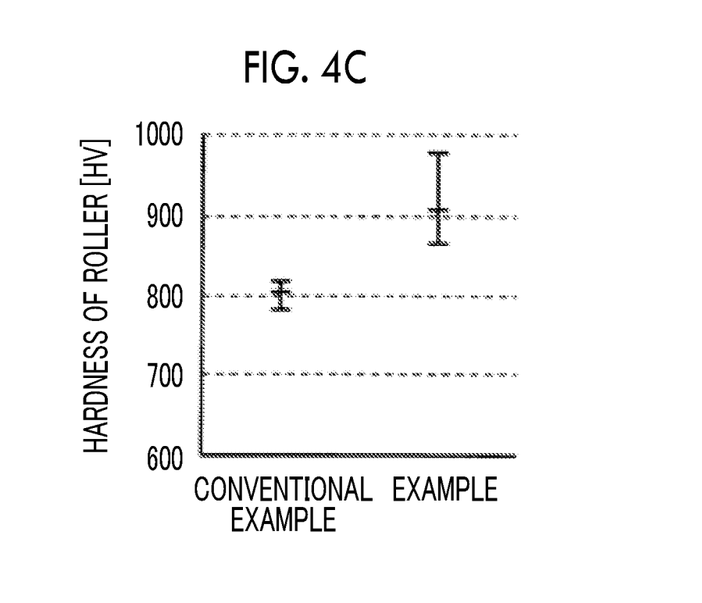
FIG. 4C is a graph showing a hardness of the roller in Example of the present disclosure and Conventional Example.
Figure 4D:
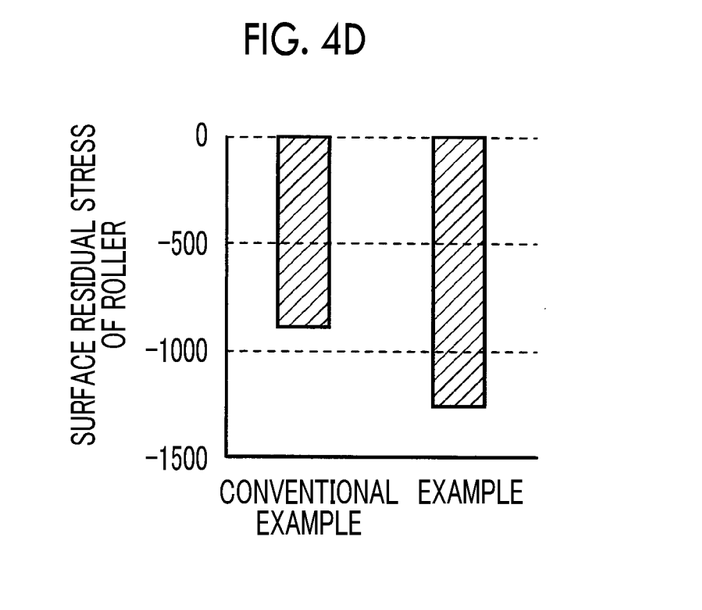
FIG. 4D is a graph showing a surface residual stress of the roller in Example of the present disclosure and Conventional Example.

With respect to Example and Conventional Example, FIG. 4A shows Rvk and FIG. 4B shows Rk of the surface of the roller 2, FIG. 4C shows the Vickers hardness of the surface of the roller 2, and FIG. 4D shows a surface residual stress of the roller 2, respectively. In addition, FIG. 5A and FIG. 5B show Rvk and Rk of the surfaces of the raceway surfaces 3a, 4a of the washers 3, 4 in Example and Conventional Example, respectively.

As shown in FIG. 4A, Rvk of the surface of the roller 2 is larger than 0.1 in Conventional Example, whereas it is 0.01 to 0.10 in Example. Further, as shown in FIG. 4B, Rk of the surface of the roller 2 is larger than 0.1 in Conventional Example, whereas it is 0.01 to 0.08 in Example. As described above, in Example according to the present disclosure, both Rvk and Rk of the surface of the roller 2 are small and the surface roughness is also small as compared with Conventional Example.

In addition, as shown in FIG. 4C, the Vickers hardness of the surface of the roller 2 is 830 or smaller in Conventional Example, whereas it is 860 to 980 in Example. Further, as shown in FIG. 4D, the surface compressive residual stress of the roller 2 is −900 MPa in Conventional Example, whereas it is smaller than −900 MPa (absolute value is larger than 900 MPa) and also −1000 MPa or smaller in Example. That is, in Example according to the present disclosure, the surface of the roller 2 is hard and the absolute value of the surface compressive residual stress is large as compared with Conventional Example.

Figure 5A:
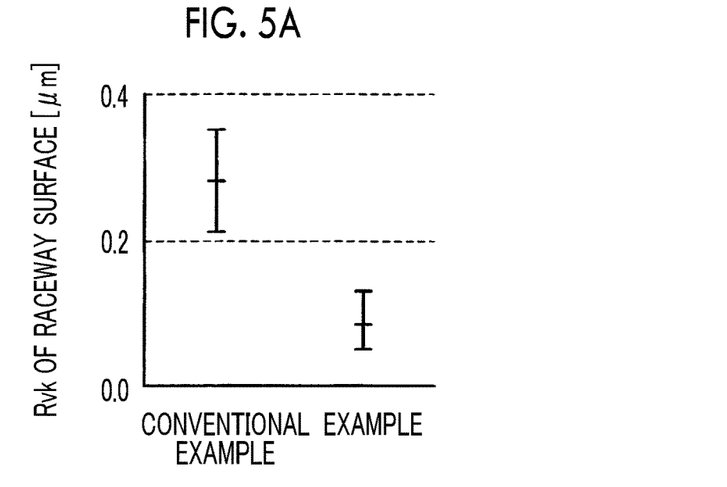
FIG. 5A is a graph showing Rvk of surface roughnesses of raceway surfaces of washers in Example of the present disclosure and Conventional Example.
Figure 5B:
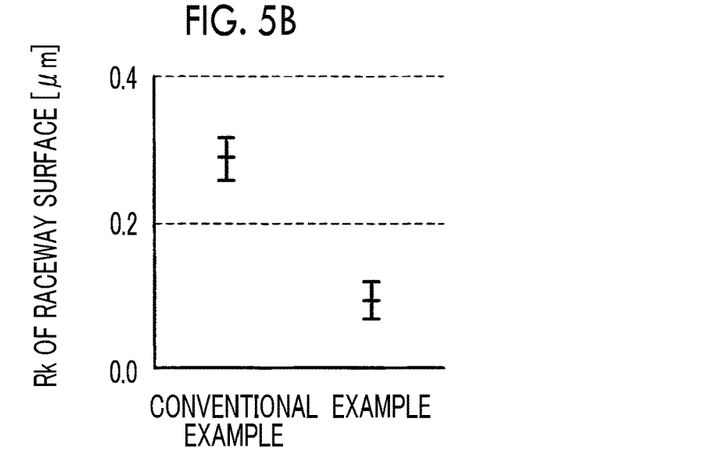
FIG. 5B is a graph showing Rk of the surface roughnesses of the raceway surfaces of the washers in Example of the present disclosure and Conventional Example.

In addition, as shown in FIG. 5A, Rvk of the surfaces of the raceway surfaces 3a, 4a is 0.2 or larger in Conventional Example, whereas it is 0.05 to 0.20 in Example. Further, as shown in FIG. 5B, Rk of the surfaces of the raceway surfaces 3a, 4a is 0.2 or larger in Conventional Example, whereas it is 0.08 to 0.15 in Example. As described above, in Example according to the present disclosure, both Rvk and Rk of the surfaces of the raceway surfaces 3a, 4a are small and the surface roughnesses are also small as compared with Conventional Example.

Figure 6:
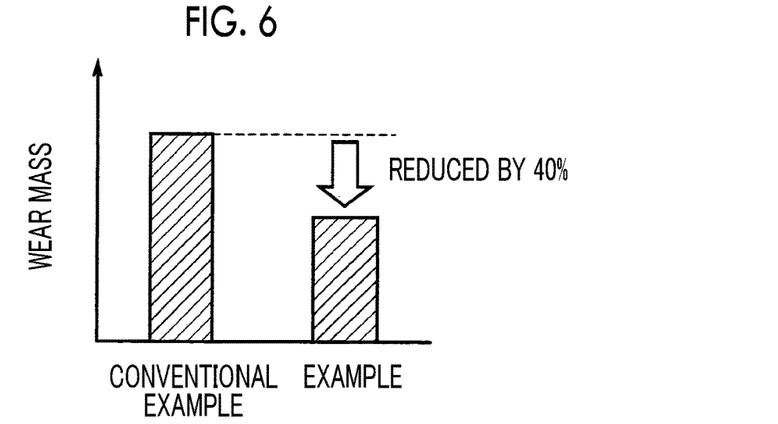
FIG. 6 is a graph showing wear mass in Example of the present disclosure and Conventional Example.

FIG. 6 shows measurement results of the wear mass of Example and Conventional Example. The measurement results in FIG. 6 represents an average value of three times of tests. As shown in FIG. 6, in Example according to the present disclosure, the wear mass is reduced by approximately 40% as compared with Conventional Example, and the foreign matter resistance is significantly improved as compared with Conventional Example.

Action and Effect of Embodiment

As described above, in the thrust roller bearing 1 according to the present embodiment, the roller 2 is made of high-carbon chromium bearing steel. The surface compressive residual stress is smaller than −900 MPa, and the surface roughness is 0.01 to 0.10 in terms of Rvk and 0.01 to 0.08 in terms of Rk, and the Vickers hardness of the surface is 860 to 980. Further, in the thrust roller bearing 1 according to the present embodiment, at least one of the washers 3, 4 is made of carbon steel, and the surface roughnesses of the raceway surfaces 3a, 4a are 0.05 to 0.20 in terms of Rvk and 0.08 to 0.15 in terms of Rk.

By reducing the surface roughness of the roller 2 and the surface roughnesses of the raceway surfaces 3a, 4a, the foreign matter 6 is easily discharged by the flow of the lubricating oil. The wear due to the influence of the foreign matter 6 is suppressed, and the foreign matter resistance can be improved. Further, by increasing the hardness of the surface of the roller 2 by the shot peening, the wear resistance of the roller 2 is further increased, and the foreign matter resistance can be improved.

ADDITIONAL REMARK

Although the present disclosure is described above based on the embodiment, the embodiment does not limit the disclosure according to the claims. It should be noted that not all combinations of the features described in the embodiment are essential to the means for solving the problems of the present disclosure.

Further, the present disclosure can be appropriately modified and implemented without departing from the spirit of the present disclosure. For example, in the embodiment, a case where the rollers 2 are arranged in one row in a circumferential direction is described, but the arrangement of the rollers 2 is not limited to this, and for example, the rollers 2 may be arranged in two or more rows.

What is claimed is:

1. A thrust roller bearing, comprising:
a plurality of rollers; and
a pair of annular washers having raceway surfaces on which the rollers roll, the raceway surfaces being arranged to face each other, wherein:
the roller is made of high-carbon chromium bearing steel, and contains 1.1 mass % to 1.6 mass % of carbon and 0.1 mass % to 0.6 mass % of nitrogen in a range of 0.1 mm from a surface;
an absolute value of a surface compressive residual stress is greater than 900 MPa, a surface roughness is 0.01 to 0.10 in terms of Rvk and 0.01 to 0.08 in terms of Rk, and a Vickers hardness of the surface is 860 to 980; and at least one of the washers is made of carbon steel, and surface roughnesses of the raceway surfaces are 0.05 to 0.20 in terms of Rvk and 0.08 to 0.15 in terms of Rk.

2. The thrust roller bearing according to claim 1, wherein both of the washers are made of carbon steel, and the surface roughnesses of the raceway surfaces are 0.05 to 0.20 in terms of Rvk and 0.08 to 0.15 in terms of Rk.

* * * * *